US008902334B2

United States Patent
Adachi (10) Patent No.: US 8,902,334 B2
(45) Date of Patent: Dec. 2, 2014

(54) TERMINAL APPARATUS AND METHOD FOR ADDING AN EFFECT TO AN IMAGE

(75) Inventor: Hiroaki Adachi, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 655 days.

(21) Appl. No.: 13/107,430

(22) Filed: May 13, 2011

(65) Prior Publication Data

US 2012/0086834 A1    Apr. 12, 2012

Related U.S. Application Data

(60) Provisional application No. 61/392,238, filed on Oct. 12, 2010.

(51) Int. Cl.
| | |
|---|---|
| H04N 5/262 | (2006.01) |
| H04N 5/232 | (2006.01) |
| H04N 5/235 | (2006.01) |
| G06T 11/00 | (2006.01) |

(52) U.S. Cl.
CPC ........... *H04N 5/23219* (2013.01); *H04N 5/235* (2013.01); *G06T 11/00* (2013.01)
USPC .......................................................... 348/239

(58) Field of Classification Search
USPC .......................................................... 348/239
See application file for complete search history.

(56) References Cited

U.S. PATENT DOCUMENTS

| | | | |
|---|---|---|---|
| 7,362,919 B2 * | 4/2008 | Das et al. ...................... | 382/284 |
| 8,237,819 B2 * | 8/2012 | Shkurko et al. ............... | 348/239 |
| 2005/0206751 A1 * | 9/2005 | Manico et al. ................ | 348/239 |
| 2008/0317455 A1 * | 12/2008 | Abe .............................. | 396/263 |
| 2010/0214442 A1 * | 8/2010 | Uemura et al. ............ | 348/231.2 |
| 2010/0271513 A1 * | 10/2010 | Yamakado et al. ........... | 348/239 |

FOREIGN PATENT DOCUMENTS

JP    2000-022929    1/2000

* cited by examiner

*Primary Examiner* — James Hannett
(74) *Attorney, Agent, or Firm* — Oblon, Spivak, McClelland, Maier & Neustadt, L.L.P.

(57) ABSTRACT

A terminal apparatus including: an image capturing unit configured to capture an image of a subject; a storage unit configured to store a table that associates information related to an image with at least one effect to be applied to an image; a control unit configured to detect or receive information related to the image captured by the image capturing unit, and select an effect from the table stored in the storage unit based on the detected or received information related to the image; and an image processing unit configured to apply the selected effect to the captured image.

15 Claims, 9 Drawing Sheets

| | | | CONDITION | DECORATION SELECTION |
|---|---|---|---|---|
| A. FACE DETECTION | A. FACE DETECTION | A. FACE DETECTION | A. FACE DETECTION | |
| | B. SCENE DETECTION | D. USER INFORMATION | C. PHOTOGRAPHING TIME | |
| A. FACE INCLUDED | A. SMILING FACE INCLUDED | A. LAUGHTER | | DIAMOND |
| | | A. ORDINARY SMILING FACE | | HEART |
| | | A. SMILE | | FLOWER |
| | A. NO SMILING FACE INCLUDED | A. NO EYEGLASSES INCLUDED | A. CHILD | MUSICAL NOTE |
| | | | A. ADULT (FEMALE) | CANDY |
| | | | A. ADULT (MALE) | BOW |
| | | A. EYEGRASSES INCLUDED | | EYEGLASSES |
| A. NO FACE INCLUDED | B. SCENE: LANDSCAPE | D. BIRTHDAY | | RAINBOW |
| | B. SCENE: OTHER THAN LANDSCAPE | D. OTHER THAN BIRTHDAY | C. JANUARY TO MARCH | CAKE |
| | | | | SNOW |
| | | | C. APRIL TO JUNE | LEAFLET |
| | | | C. JULY TO SEPTEMBER | SUN |
| | | | C. OCTOBER TO DECEMBER | AUTUMN LEAVE |

FIG. 4A
SMILE

FIG. 4B
APRIL TO JUNE

FIG. 4C
LANDSCAPE

FIG. 6

| A. FACE DETECTION | A. FACE DETECTION<br>B. SCENE DETECTION | A. FACE DETECTION<br>A. USER INFORMATION<br>E. LOCATION INFORMATION | A. FACE DETECTION<br>C. PHOTOGRAPHING TIME<br>E. LOCATION INFORMATION | CONDITION | DECORATION SELECTION |
|---|---|---|---|---|---|
| A. FACE INCLUDED | A. SMILING FACE INCLUDED | A. LAUGHTER | | | DIAMOND |
| | | A. ORDINARY SMILING FACE | | | HEART |
| | | A. SMILE | | | FLOWER |
| | A. NO SMILING FACE INCLUDED | A. NO EYEGLASSES INCLUDED | A. CHILD | | MUSICAL NOTE |
| | | | A. ADULT (FEMALE) | | CANDY |
| | | | A. ADULT (MALE) | | BOW |
| | | A. EYEGLASSES INCLUDED | | | EYEGLASSES |
| A. NO FACE INCLUDED | B. SCENE: LANDSCAPE | E. NO LOCATION INFORMATION INCLUDED | | | RAINBOW |
| | | E. LOCATION INFORMATION INCLUDED | E. REGISTRATION AREA (HOME OR THE LIKE) | | HOME |
| | | | E. NORTH AREA (HOKKAIDO OR THE LIKE) | | CORN |
| | | | E. EAST AREA (TOKYO OR THE LIKE) | | TOKYO TOWER |
| | | | E. WEST AREA (NAGOYA OR THE LIKE) | | SHACHIHOKO |
| | | | E. SOUTH AREA (OKINAWA OR THE LIKE) | | SHISA |
| | B. SCENE: OTHER THAN LANDSCAPE | D. BIRTHDAY | | | CAKE |
| | | D. OTHER THAN BIRTHDAY | C. JANUARY TO MARCH | | SNOW |
| | | | C. APRIL TO JUNE | | LEAFLET |
| | | | C. JULY TO SEPTEMBER | | SUN |
| | | | C. OCTOBER TO DECEMBER | | AUTUMN LEAVE |

FIG. 7

| A. FACE DETECTION | B. SCENE DETECTION | C. BRIGHTNESS DETECTION | D. FOCAL LENGTH | CONDITION / EFFECT SELECTION |
|---|---|---|---|---|
| FEMALE | OTHER THAN BACKLIGHT | — | — | 1. FACIAL BEAUTY |
| — | NIGHT VIEW | DETECTED | — | 2. DIAMOND |
| NOT DETECTED | DISTANT VIEW | — | INFINITY | 3. MINIATURIZATION |
| NOT DETECTED | LANDSCAPE AND WELL-LIT PLACE | — | MACRO | 4. VIVID |

FIG. 8A
FACIAL BEAUTY

FIG. 8B
DIAMOND

FIG. 8C
MINIATURIZATION

FIG. 8D
VIVID

FIG. 9

TERMINAL APPARATUS AND METHOD FOR ADDING AN EFFECT TO AN IMAGE

CROSS REFERENCE TO RELATED APPLICATIONS

This application is related to and claims priority under 35 U.S.C. §119(e) to Provisional Application Ser. No. 61/392,238, filed Oct. 12, 2010, the contents of which are hereby incorporated herein by reference.

BACKGROUND

1. Field

The present specification relates to a mobile terminal and a program that can be applied to a mobile-phone terminal or the like including a photographing device, and more particularly to a technology of adding an image correction of some kind to video input to the photographing device and outputting the input video as an image.

2. Description of the Related Art

Hitherto, a photographing device (a camera) having the function of performing special photographing including monochrome photographing, mosaic photographing, etc. has been available. The special-photographing function is not the function of outputting original picked-up video input to an optical system of the photographing device (actual video) as an image, but the function of adding an image correction of some kind (a decoration, an effect, etc.) to the actual video within the photographing device and outputting the corrected video as an image.

Further, a photographing device configured to detect a subject such as a person, automatically add a decoration to the background of the subject, and output an image has been available (see, for example, Japanese Unexamined Patent Application Publication No. 2000-22929).

However, according to related technologies including, for example, a technology disclosed in Japanese Unexamined Patent Application Publication No. 2000-22929, at least two types of special effects are often provided and a user should select the effect types before performing photographing. Further, special effects appropriate for a subject should be selected by the user.

Further, the types of decorations that shall be added to an image are determined in advance irrespective of the subject. Otherwise, the types of the decorations should be determined in advance by the user. Consequently, only a certain effect can be obtained no matter what kind subject is photographed.

BRIEF SUMMARY

Accordingly, the present specification has been achieved to automatically change the type of a decoration, an effect, etc. in accordance with various conditions of a subject and/or photographing time.

According to an embodiment, a terminal apparatus is provided comprising: an image capturing unit configured to capture an image of a subject; a storage unit configured to store a table that associates information related to an image with at least one effect to be applied to an image; a control unit configured to detect or receive information related to the image captured by the image capturing unit, and select an effect from the table stored in the storage unit based on the detected or received information related to the image; and an image processing unit configured to apply the selected effect to the captured image.

According to another embodiment, a method implemented on a terminal apparatus is provided comprising: capturing an image of a subject; storing a table that associates information related to an image with at least one effect to be applied to an image; detecting or receiving information related to the captured image, and selecting an effect from the stored table based on the detected or received information related to the image; and applying the selected effect to the captured image.

According to another embodiment, a computer readable storage medium encoded with computer executable instructions is provided, which when executed by a mobile terminal apparatus, cause the mobile terminal apparatus to perform a method comprising: capturing an image of a subject; storing a table that associates information related to an image with at least one effect to be applied to an image; detecting or receiving information related to the captured image, and selecting an effect from the stored table based on the detected or received information related to the image; and applying the selected effect to the captured image. Here, the term "effect" denotes every visual effect including decorations.

The above-described configuration allows for automatically selecting an effect appropriate for a photographed image based on the analysis result of the photographed image.

According to an embodiment, an appropriate decoration or effect is automatically selected based on the analysis result of a photographed image (e.g., various conditions of a subject and/or photographing time) so that an output image with an applied visually-appropriate effect can be automatically acquired, which increases the photographing quality.

DETAILED DESCRIPTION

Hereinafter, embodiments will be described with reference to the attached drawings. The descriptions will be given in the following order. Further, like parts illustrated in the attached drawings are designated by like reference numerals to omit or simplify redundancy of the descriptions.

1. First Embodiment (the example where time information is included in the conditions of a subject and/or photographing time, and a decoration is selected)

2. Second Embodiment (the example where location information is further included in the conditions of the subject and/or the photographing time, and a decoration is selected)

3. Third Embodiment (the example where an effect is selected in accordance with the conditions of the subject and/or the photographing time)

[1. First Embodiment]

In a first embodiment, various conditions of a subject and/or the photographing time are automatically identified, and a decoration that shall be added to image data is automatically selected in accordance with the identified conditions through the special photographing function (especially, the function of adding a decoration to image data) of a photographing device. The conditions that are automatically identified with the photographing device will be described later. In the following descriptions, the photographing device is applied to a photographing device (an exemplary image-pickup unit)-equipped mobile terminal (more specifically, a mobile-phone terminal) and image data acquired through photographing is determined to be still-image data.

[Block Configuration of Mobile-Phone Terminal]

Figure 1:
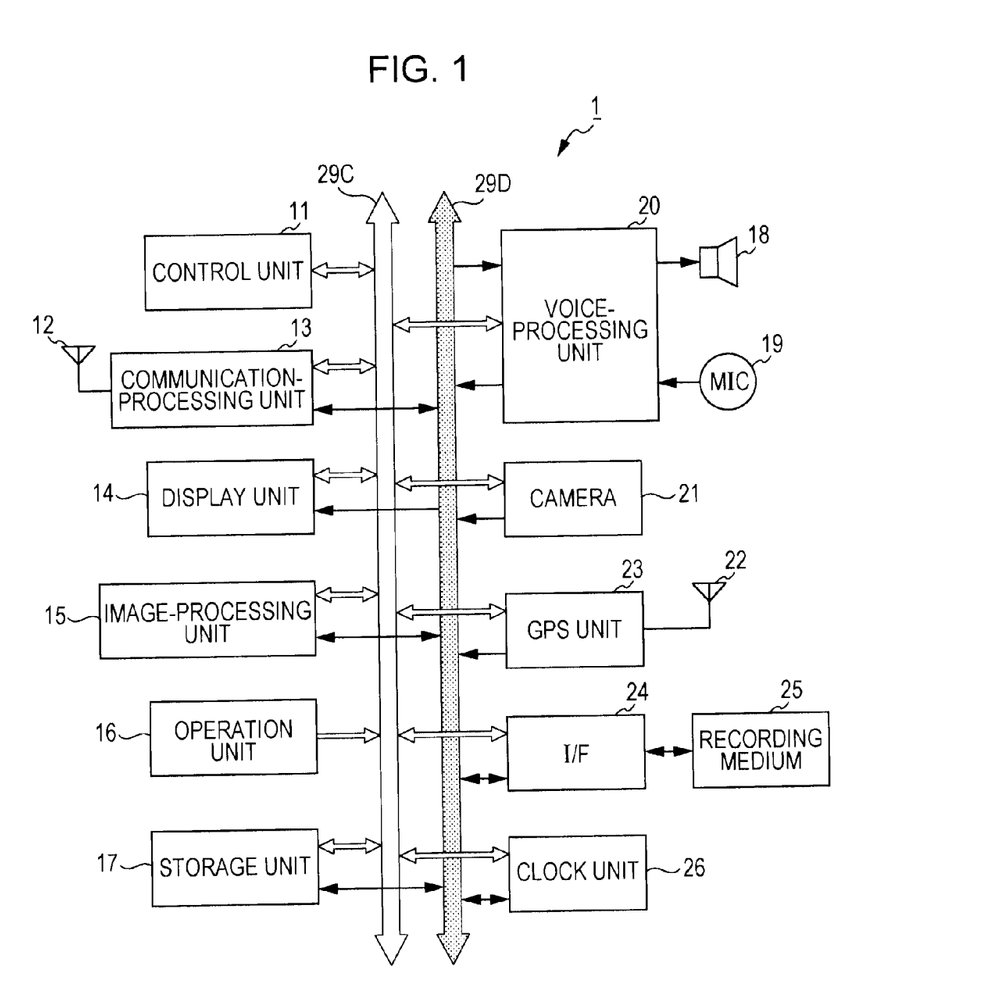
FIG. 1 is a block diagram illustrating an exemplary configuration of a mobile-phone terminal including a photographing device according to a first embodiment.

FIG. 1 is a block diagram illustrating an exemplary configuration of a mobile-phone terminal 1 including a photographing device according to the first embodiment.

The mobile-phone terminal 1 is provided with a control unit 11 including a microprocessor or the like, and the control unit 11 is connected to each of units that are included in the mobile-phone terminal 1 via a control line 29C through which a control signal is transferred and/or a data line 29D through which data is transferred. The control unit 11 communicates with the units and controls the operations of the units via the above-described lines.

The mobile-phone terminal 1 further includes a communication-processing unit 13 performing wireless-communication processing for a wireless phone, to which an antenna 12 is connected. The communication-processing unit 13 wirelessly communicates with a base station provided for the wireless phone so that an interactive-data transfer is performed between the communication-processing unit 13 and the base station. The communication-processing unit 13 transmits data transmitted from the base station-side via the antenna 12 to each of the units of the mobile-phone terminal 1 via the data line 29D. Further, the communication-processing unit 13 transmits data transferred from each of the units of the mobile-phone terminal 1 via the data line 29D to the base station-side via the antenna 12.

In addition to the communication-processing unit 13, a display 14, an image-processing unit 15, an operation unit 16, and a storage unit 17 are connected to the control line 29C. The display unit 14 displays image data subjected to image processing performed through the image-processing unit 15 under the control of the control unit 11. The display unit 14 includes, for example, a liquid-crystal display, an organic electroluminescence (EL) display, etc.

The image-processing unit 15 processes transmitted image data and/or generates image data, and transmits the processed image data and/or the generated image data to the display unit 14 via the data line 29D. For example, the image-processing unit 15 performs the image processing and/or the image generation based on control performed through the control unit 11 in accordance with an operation of the operation unit 16, and transmits processed image data and/or generated image data to the display unit 14 via the data line 29D. For example, the image-processing unit 15 adds a specified decoration or applies a specified effect to data of an image photographed through the camera 21.

The operation unit 16 generates operation information (an input signal) based on an operation performed by a user, and includes button keys that are provided to input information about numerals, signs, etc. that are provided for the mobile-phone terminal, keys to which various functions are assigned, etc. Information about operations that are performed by the user for the keys of the operation unit 16 is transmitted to the control unit 11 via the control line 29C. When performing various setting operations, information about guidance on the various setting operations is displayed on the display unit 14 and the user operates the operation unit 16 based on the displayed guidance so that desired settings are made.

The storage unit 17 includes a read only memory (ROM) and/or a random access memory (RAM) storing a computer program used to make the mobile-phone terminal 1 of the present embodiment operate, data generated or acquired by the user, and so forth. As the computer program, a program that identifies various conditions of a subject and/or photographing time, and that makes the control unit 11 perform processing to select a decoration, an effect, etc. which shall be added to image data based on the identified conditions is stored in the ROM and/or the RAM. Further, the storage unit 17 stores condition-table data seen by the user when determining a decoration and/or an effect based on image data acquired through photographing.

A voice-processing unit 20, a camera 21, a global positioning system (GPS)-unit 23, an interface (I/F) 24, and a clock unit 26 are further connected to the control line 29C.

The voice-processing unit 20 is provided to perform processing relating to the reproduction of an audio signal, and is connected to a speaker 18 and a microphone 19 that are used as a telephone receiver during a telephone conversation. That is, voice data transmitted from the communication-processing unit 13 to the voice-processing unit 20 is demodulated and changed into an analog-voice signal through the voice-processing unit 20, and the analog-voice signal is subjected to analog processing such as amplification, and the analog-voice signal is emitted from the speaker 18. Further, a voice signal collected through the microphone 19 is modulated into digital-voice data through the voice-processing unit 20, and the modulated digital-voice data is transmitted to the communication-processing unit 13 to perform, for example, wireless transmission. Further, the speaker 18 emits a voice or the like generated based on an application program that had been started.

The camera 21 is an example of the photographing device and includes an optical system (not shown) including a focus lens, an iris, and so forth, a drive circuit driving the optical system under the control of the control unit 11, an image-pickup device converting an optical image transmitted via the optical system into an electrical signal, and so forth. Charge coupled devices (CCDs) and/or complementary metal oxide semiconductors (CMOSes) are exemplarily applied to the image-pickup device. An amplification circuit and/or an analog-to-digital conversion circuit (not shown) is provided in the image-pickup device or the stage subsequent to the image-pickup device, so as to generate and output image data including digital signals.

The GPS unit 23 is provided to calculate the current location of the mobile-phone terminal 1 through the use of the GPS. In that case, the GPS unit 23 receives a radio wave transmitted from a GPS satellite via an antenna 22, analyzes information included in the radio wave, and transmits information about a result of the analysis to the control unit 11 so that location information indicating the latitude, the longitude, the altitude, and so forth of the mobile-phone terminal 1 is acquired. Further, the location information indicating the current location of the mobile-phone terminal 1 can also be acquired through the control unit 11 analyzing information included in a radio wave transmitted from the base station to the communication-processing unit 13.

The I/F 24 functions as the interface between the mobile-phone terminal 1 and a recording medium 25. For example, a computer program may be recorded onto the recording medium 25 and the control unit 11 may read and perform the recorded computer program so that the mobile-phone terminal 1 performs specified operations and functions.

The clock unit 26 is provided to indicate the date and/or the time so that the photographing time can be acquired by receiving time information transmitted from the clock unit 26 at the photographing time.

Figure 2:
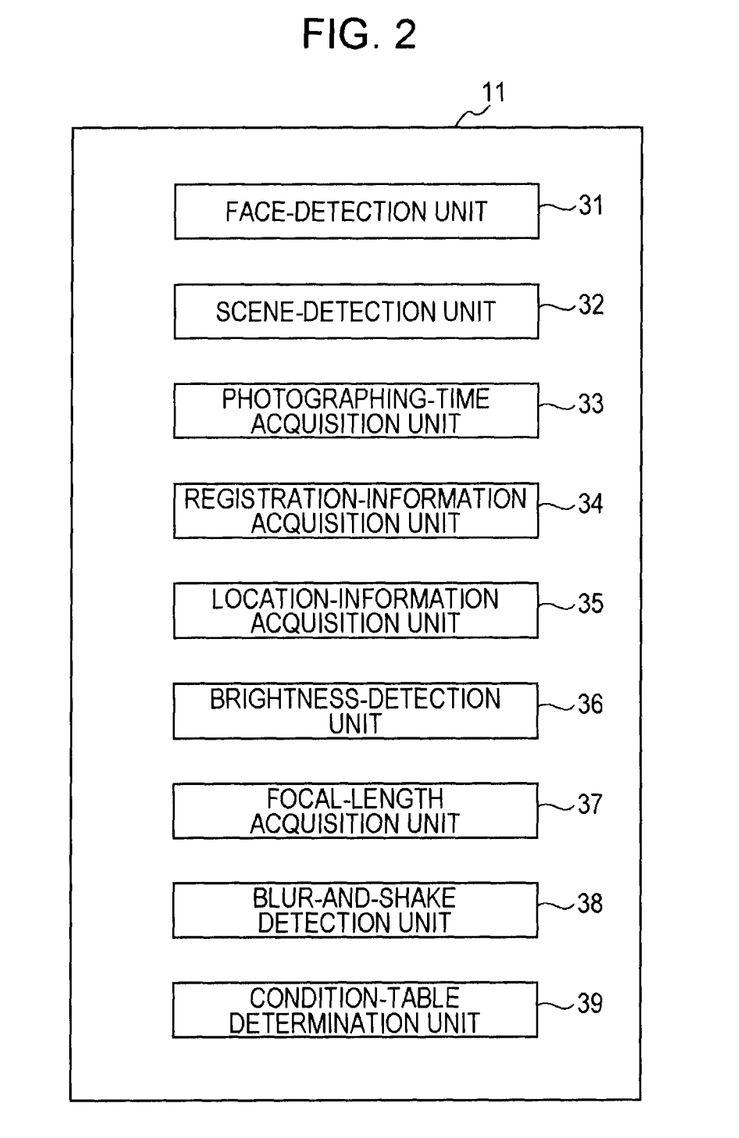
FIG. 2 is a block diagram illustrating the function of a control unit.

FIG. 2 is a block diagram illustrating the function of the control unit 11 of the mobile-phone terminal 1. The control unit 11 functions as a face-detection unit 31, a scene-detection unit 32, a photographing-time acquisition unit 33, a registration-information acquisition unit 34, a location-information acquisition unit 35, a brightness-detection unit 36, a focal-length acquisition unit 37, a blur-and-shake detection unit 38, and a condition-table determination unit 39 by reading and performing a computer program stored in the storage unit 17. Except for the condition-table determination unit 39, the function of each of the above-described units is a related technology. Hereinafter, the details of the functions will be briefly described.

The face-detection unit 31 detects data of a person (face) based on the data of an image photographed through the camera 21 and further detects data of the sex, the age, the expression, the presence or absence of eyeglasses, etc. based on the details of the detected face data. Data of the detection result is output to the condition-table determination unit 39.

The scene-detection unit 32 identifies a subject and/or an environment (a landscape, a night view, etc.) observed at the photographing time in accordance with the characteristics (the amount of light, the color saturation, the focal length, etc.) of a picked-up image based on the data of the image photographed through the camera 21. Otherwise, the scene-detection unit 32 may identify the subject and/or the environment based on information about mode selected at the photographing time. Data of the detection result is output to the condition-table determination unit 39.

The photographing-time acquisition unit 33 acquires information indicating the date and time of the photographing from the clock unit 26 provided in the mobile-phone terminal 1. Data of the acquisition result is output to the condition-table determination unit 39.

The registration-information acquisition unit 34 acquires user information (about a birthday or the like) registered with the mobile-phone terminal 1 (the storage unit 17) by the user. Data of the acquisition result is output to the condition-table determination unit 39. Here, the user information for registration may be information about the user or about the person corresponding to a subject shown on input video. When the user information is the information about the person corresponding to the subject, the user is specified by comparing face-image data acquired through photographing to that that had already been registered by using a related face-identification technology, and the user information about the specified user is acquired.

The location-information acquisition unit 35 acquires information about the current location, that is, information about the location of the mobile-phone terminal 1, which is observed at the photographing time, via the GPS unit (the GPS satellite) 23 and/or the communication-processing unit (the base station) 13. Information about the acquisition result is output to the condition-table determination unit 39.

The brightness-detection unit 36 divides the photographing area into a plurality of areas based on the image photographed through the camera 21, and detects the brightness of each of the areas. When a brightness with a value not less than a specified value is detected from a photographed image of the night view or the like, the brightness-detection unit 36 outputs information about the detected brightness. Data of the detection result is output to the condition-table determination unit 39.

The focal-length acquisition unit 37 measures and acquires the distance between the camera 21 and the subject (the focal length) based on data of the image photographed through the camera 21. Information about details of the acquired distance is output to the condition-table determination unit 39. Although the focal length is measured and acquired through the focal-length acquisition unit 37 in the present embodiment, the measurement and the acquisition may be performed in the camera 21 or through hardware including a digital signal processor (DSP), for example. Further, settings on the photographing-time focus may be replaced with data of the distance between the camera 21 and the subject.

The blur-and-shake detection unit 38 detects the degree of a blur and/or a shake of a subject shown on the image data captured through the camera 21 based on the image photographed through the camera 21. Data of the detection result is output to the condition-table determination unit 39.

The condition-table determination unit 39 identifies various conditions of the subject and/or the photographing time based on the information transmitted from each of the above-described units, refers to the condition-table data based on the identified conditions, and determines a decoration that shall be added to the image data.

Thus, for achieving the present embodiment, the above-described functions should be provided to make the photographing device automatically determine the conditions of the subject and/or the photographing time. However, each of the conditions may not be provided so long as the various conditions of the subject and/or the photographing time, which will be described later, can be identified and a decoration that shall be added to the image data can be determined based on the identified conditions.

Figure 3:
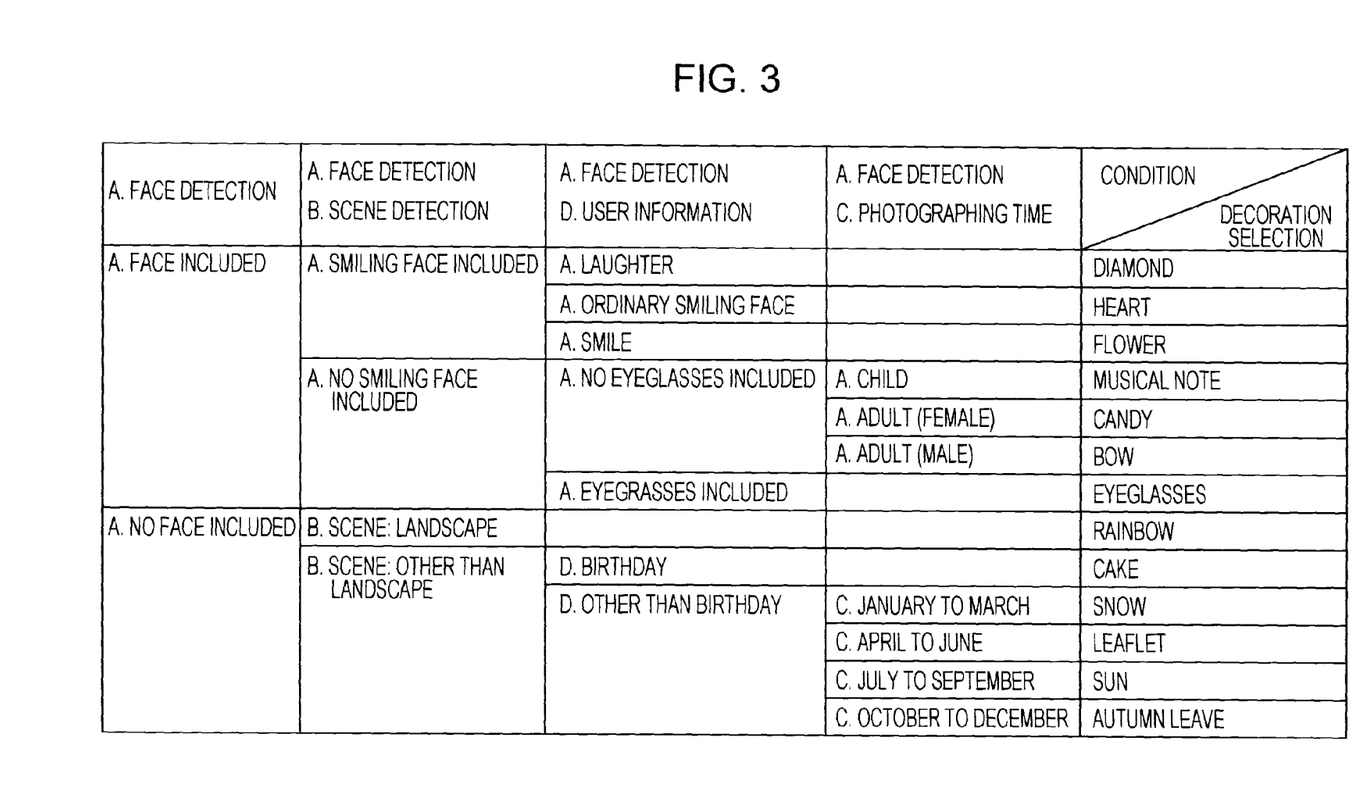
FIG. 3 illustrates exemplary condition-table data.

In the mobile-phone terminal 1, data of conditions for automatically selecting the decoration type should be compiled as the condition-table data, and the condition-table data should be stored in the mobile-phone terminal 1 in advance. FIG. 3 illustrates an example of the condition-table data stored in the storage unit 17. According to FIG. 3, a plurality of decorations are set based on data of the conditions of the subject and/or the photographing time, the data being output from the face-detection unit 31, the scene-detection unit 32, the photographing-time acquisition unit 33, and the registration-information acquisition unit 34. The condition-table determination unit 39 selects any of the decorations by referring to the condition-table data illustrated in FIG. 3.

According to FIG. 3, first, the image photographed through the camera 21 is classified as "face included" or "no face included" in the category of "A. Face Detection". Next, when the image is classified as "face included, the image is further classified as "smiling face included" or "no smiling face included". When the image is classified as "smiling face included", the image is classified as "laughter", "ordinary smiling face", or "smile", each of which indicates the degree of a smiling face. On the contrary, when the image is classified as "no smiling face included", the image is classified as "no eyeglasses included" or "eyeglasses included". When the image is classified as "no eyeglasses included", the image is further classified as "child", "adult (male)", or "adult (female)". Further, when the image is classified as "no face included", the image is classified as "landscape" or "other than landscape" in the category of "B. Scene Detection". When the image is classified as "other than landscape", the image is classified as "birthday" or "other than birthday" in the category of "D. User Information". When the image is classified as "other than birthday", the image is classified as "by photographing time" in the category of "C. Photographing Time". Decorations (motifs) are individually set in relation to the above-described final classification results (conditions).

As is clear from the condition-table data, data of a plurality of decoration images should be stored in the storage unit 17 to change a decoration image that shall be added to image data captured through the camera 21 for each condition of the subject and/or the photographing time. According to FIG. 3, decoration images (motifs) "diamond", "heart", "flower", "musical note", etc. are prepared in accordance with the number of the conditions.

According to FIG. 3, decorations appropriate for the states of a smiling face are exemplarily set. Further, the image is classified based on the presence or absence of eyeglasses, and decorations appropriate for the ages and sexes of smiling faces are especially set for the case where the image is classified as "no eyeglasses included". Different appropriate decorations are further set so that an appropriate decoration can be selected therefrom according to whether or not the image is classified as "landscape", and a different appropriate decoration can be selected therefrom according to whether or not the image is classified as "birthday". Different appropriate decorations are further set so that an appropriate decoration can be selected therefrom based on the photographing time (season) in the case where the image is classified as "other than birthday".

Figure 4A:
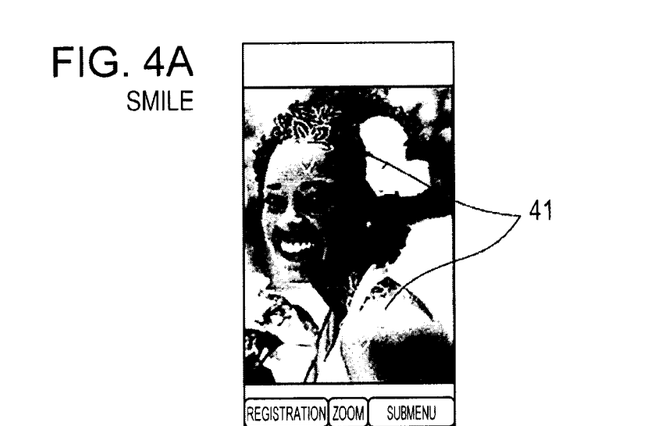
FIG. 4A illustrates an exemplary decorated image.
Figure 4B:
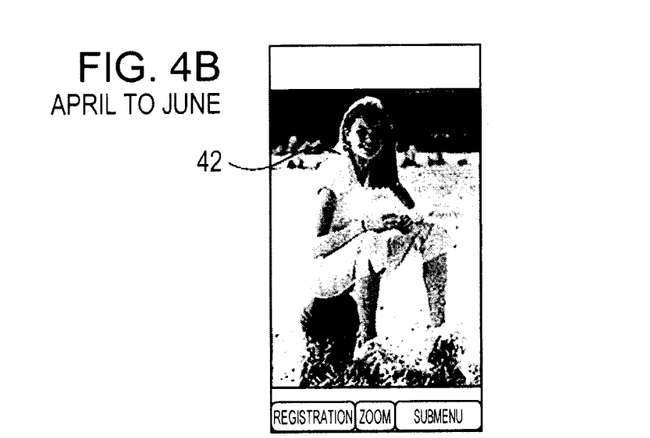
FIG. 4B illustrates a different exemplary decorated image.
Figure 4C:
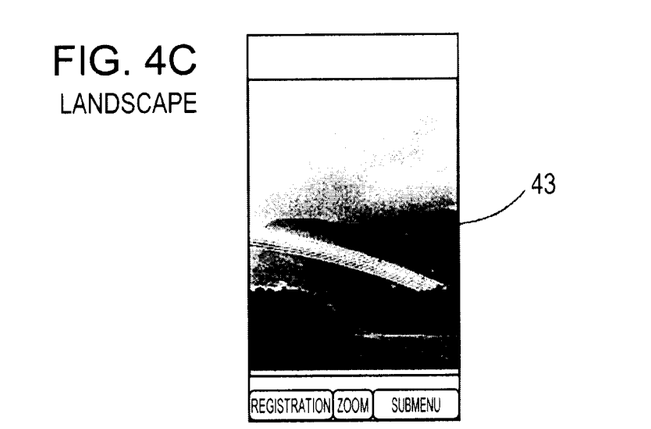
FIG. 4C illustrates a different exemplary decorated image.

Each of FIGS. 4A, 4B, and 4C illustrates an exemplary image to which a decoration image is added, which is displayed on the display unit 14. When the condition of the subject and/or the photographing time is classified as "smile", an image of the decoration "flower" illustrated with reference numeral 41 is added to each of the high-brightness parts corresponding to the forehead and the shoulder of a girl shown on the image (see FIG. 4A). Further, when the condition of the subject and/or the photographing time is classified as "April to June", an image of the decoration "leaflet" illustrated with reference numeral 42 is added to the high-brightness part corresponding to the shoulder of a girl shown on the image (see FIG. 4B). Still further, when the condition of the subject and/or the photographing time is classified as "landscape", for example, an image of the decoration "rainbow" illustrated with reference numeral 43 is added to part of the image (see FIG. 4C), the part satisfying a condition that had already been set (part with relatively high brightness).

Further, the size of the decoration image added through the image-processing unit 15 may be appropriately changed based on the size of the image and/or the subject, the location (the background) where the decoration image is added, etc. Further, the color and/or the brightness of the decoration image may also be changed based on the location (the background) where the decoration image is added, etc.

[Operations of Control Unit]

Figure 5:
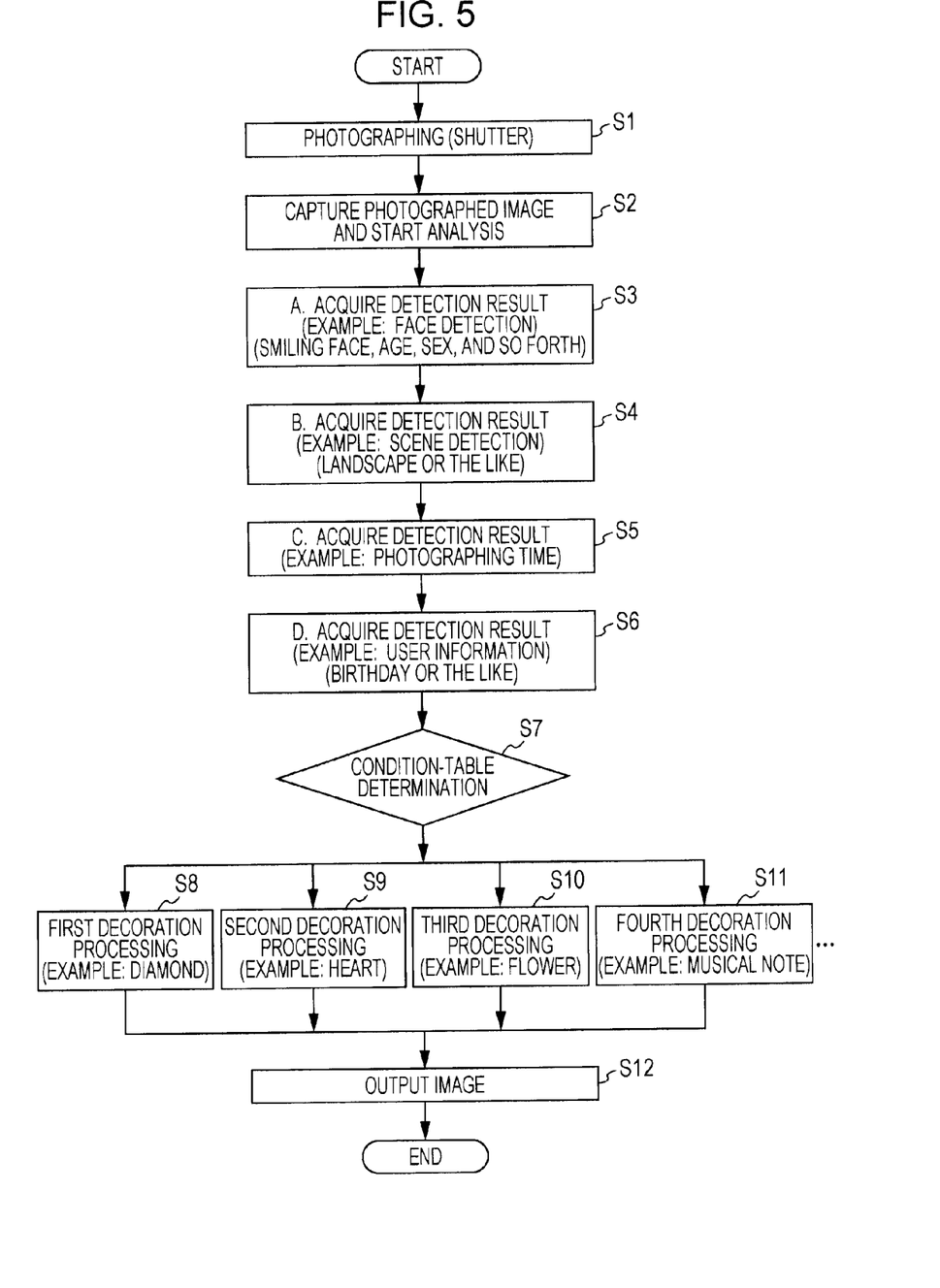
FIG. 5 is a flowchart illustrating exemplary processing from photographing to image output.

Next, processing from the photographing to the image output will be described with reference to a flowchart of FIG. 5. First, the user presses a power button (not shown) of the mobile-phone terminal 1, and power is supplied from a power circuit (not shown) to each of the blocks that are illustrated in FIG. 1 so that the mobile-phone terminal 1 enters the power-on state. When the user operates a shutter button which is a single component of the operation unit 16 in photographing mode after the power is turned on, the control unit 11 detects the operation and instructs the camera 21 to perform photographing at step S1.

Upon being instructed to perform the photographing through the control unit 11, the camera 21 captures optical-image data input to the image-pickup device (input video), and outputs the image data corresponding to the input video to the storage unit 17. Then, the control unit 11 reads and executes the computer program stored in the storage unit 17, and starts analyzing the image data temporarily stored in the storage unit 17 at step S2.

The face-detection unit 31 (see FIG. 2) performs the face detection for the image data and acquires data of the detection result at step S3. Further, the scene-detection unit 32 performs the scene detection for the image data and detects data of a landscape or the like at step S4. Further, the photographing-time acquisition unit 33 acquires information indicating the date and time of the photographing performed to acquire the image data from the clock unit 26 at step S5. Further, the registration-information acquisition unit 34 acquires the user information indicating, for example, the birthday of a person who is a subject shown in the input video from the storage unit 17 at step S6.

The condition-table determination unit 39 selects a decoration that shall be added to the image data from among the condition table data illustrated in FIG. 3 based on information acquired through the processing procedures corresponding to steps S3 to S6 at step S7, and notifies the image-processing unit 15 of the selected decoration.

The image-processing unit 15 adds the decoration notified from the condition-table determination unit 39 to the image data. According to FIG. 5, first decoration processing performed to add a diamond image, which corresponds to step S8, second decoration processing performed to add a heart image, which corresponds to step S9, third decoration processing performed to add a flower image, which corresponds to step S10, fourth decoration processing performed to add a musical-note image, which corresponds to step S11, and so forth are performed based on the decoration selected from among the condition-table data.

Then, the image-processing unit 15 outputs the decorated image data to the display unit 14 at step S12. Otherwise, the image-processing unit 15 may output the decorated image data to an external display section connected to the mobile-phone terminal 1 or the recording medium 25. After the image-output processing is finished, a series of processing procedures from the photographing to the image output is finished.

In the above-described flowchart, processing procedures that are performed to acquire the detection results correspond to steps S3 to S6. Without being limited to the above-described order, however, the processing procedures may be performed in a different order. Further, depending on the type of the subject and/or the condition of the photographing time, the detection results that are obtained immediately before the photographing is performed become equivalent to those obtained at the photographing time. For example, when photographing a subject that remains at rest in a room, it is estimated that the results of the face detection, the scene detection, and the user-information acquisition that are performed at steps S3, S4, and S6 immediately before the photographing is performed are substantially equivalent to those of the face detection, the scene detection, and the user-information acquisition that are performed at the photographing time.

According to the above-described first embodiment, an appropriate decoration is automatically selected for each of the various conditions of the subject and/or the photographing time so that an output image with an applied visually-appropriate effect can be automatically acquired, which increases the photographing quality.

Further, since the condition-table data is prepared in advance, the number of the decoration types can be increased while saving the user time and trouble. Consequently, the convenience of the user is increased.

[2. Second Embodiment]

A second embodiment is achieved by adding information about the location of the mobile-phone terminal 1 to the first embodiment as the conditions of the subject and/or the photographing time so that the decoration selection can be made based on the conditions of the subject and/or the photographing time in consideration of the location information. Hereinafter, the second embodiment will be described with an emphasis on the differences between the first and second embodiments.

Figure 6:
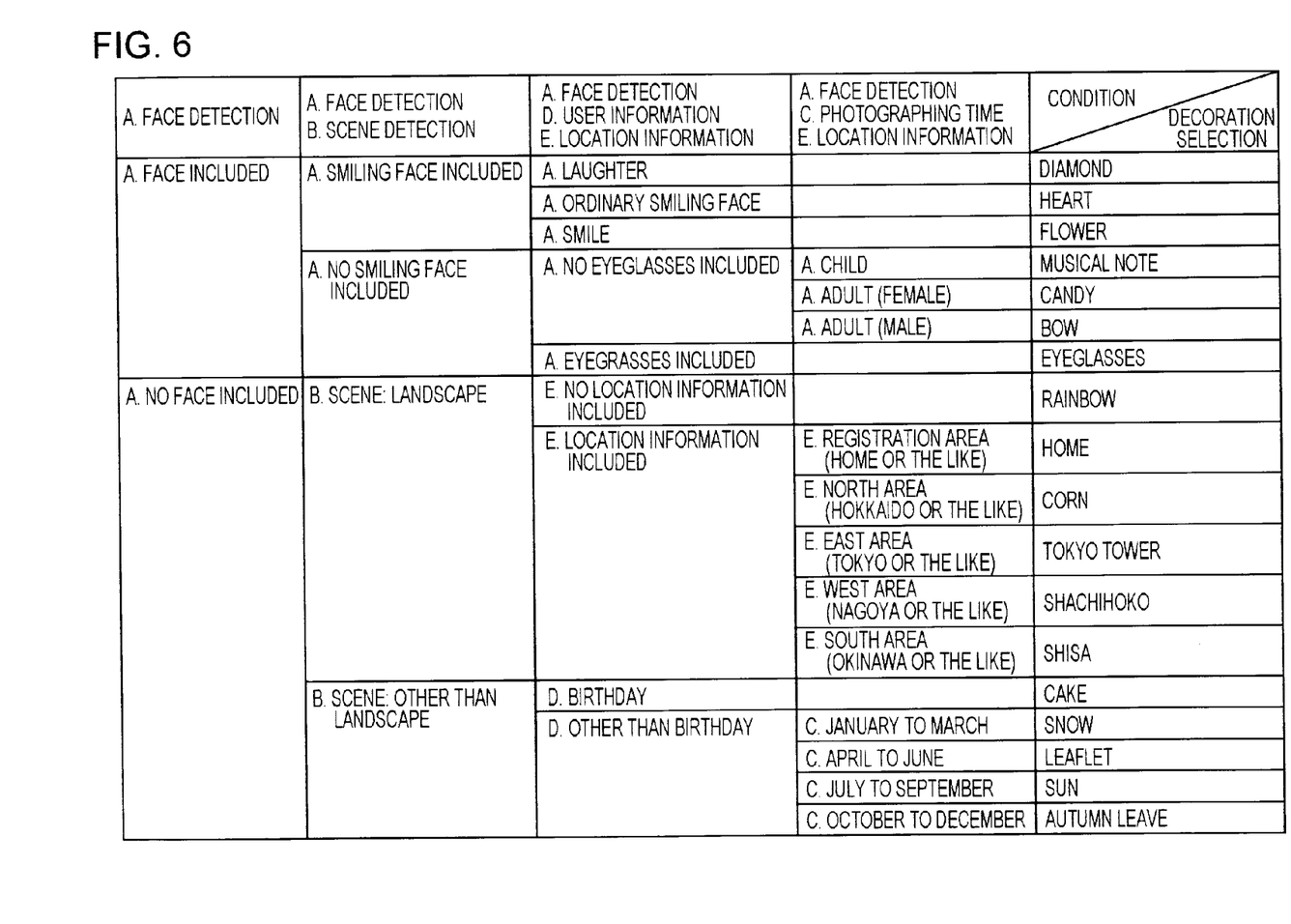
FIG. 6 illustrates exemplary condition-table data according to a second embodiment.

FIG. 6 illustrates exemplary condition-table data achieved by adding information about the location of the mobile-phone terminal 1 to the condition-table data illustrated in FIG. 3, as the conditions of the subject and/or the photographing time. The location information is acquired through the location-information acquisition unit 35 (see FIG. 2).

According to FIG. 6, for example, when the image data captured through the camera 21 is classified as "no face included" based on the result of "A. Face Detection" and is classified as "landscape" based on the result of "B. Scene detection", the image data is classified as either "no location information included" or "location information included" based on the result of acquiring "E. Location Information". When the image data is classified as "location information included", the image data is further classified as, for example, "registration area (home or the like)", "north area (Hokkaido or the like)", "east area (Tokyo or the like)", "west area (Nagoya or the like)", or "south area (Okinawa or the like)".

When the term "registration area" indicates the area around a home, for example, a decoration motif "home" is set. Further, when the term "north area" is exemplarily determined to be Hokkaido, a decoration motif "corn" is set. Still further, when the term "east area" is exemplarily determined to be Tokyo, a decoration motif "Tokyo tower" is set. Still further, when the term "west area" is exemplarily determined to be Nagoya, a decoration motif "shachihoko" is set. Still further, when the term "south area" is exemplarily determined to be Okinawa, a decoration motif "shisa" is set. Without being limited to the above-described embodiment, many further areas may be registered as the location information, and different areas, place-names, and so forth may also be registered.

According to the above-described second embodiment, information about the location of the mobile-phone terminal 1, which is observed at the photographing time, is added to the various conditions of the subject and/or the photographing time so that an appropriate decoration is automatically selected in consideration of the location information acquired at the photographing time. Since the decoration relating to the photographing-time location is added to the image data, it becomes possible to remember the photographing-time location, that is, a place where the user stopped at even though the image shows no subject suggesting the photographing-time location. As a matter of course, the action and the effects of the second embodiment are the same as those of the first embodiment.

Hereinafter, modifications of the second embodiment, that is, other examples where the location information is used as the conditions of the subject and/or the photographing time will be described.

[First Modification]

According to a first modification of the second embodiment, the decoration image is changed based on the moving distance from a point where the previous photographing is performed. For example, a decoration "bicycle" is selected when the moving distance is short, a decoration "automobile" is selected when the moving distance is moderate, and a decoration "airplane" is selected when the moving distance is long.

Thus, a transportation form determined based on the moving distance from the point where the previous photographing is performed is set as a decoration, which helps the user to understand that an image with the decoration is a first image photographed at the place after the user moves to the place.

Further, it may be arranged that no transportation-form decoration is added to an image when the moving distance from the point where the previous photographing is performed is significantly short. In that case, the transportation-form decoration is added to an image photographed at a certain place immediately after the user moves to the place. For other photographed images, the decorations that are registered with the condition-table data illustrated in each of FIGS. 3 and 6 can be used.

[Second Modification]

According to a second modification of the second embodiment, when continuous photographing is performed at the place where the previous photographing is performed or in a specified range, a different decoration is added to each of images that are obtained through the continuous photographing. Data of many different decoration images is stored in the storage unit 17 and decoration images are selected therefrom in a predetermined order or randomly.

Thus, the different decoration is added to each of the images so that the user can enjoy a different image each time.

[Third Modification]

According to a third modification of the second embodiment, the location information of the mobile-phone terminal 1 is combined with map information and the decoration image is changed based on the characteristics of the photographing place. For example, a decoration "ship" is added to data of an image when the image is photographed on the beach, a decoration "mascot character" is added to data of an image when the image is photographed in an amusement park, a decoration "peace mark" is added to data of an image when the image is photographed in a school (a school yard), and a decoration "animal" is added to data of an image when the image is photographed in a park.

Thus, the location information is combined with the map information and the decoration image is changed based on the characteristics of the photographing place so that the user can photograph a memorial image that can be photographed only in a specific or special place.

[3. Third Embodiment]

In a third embodiment, various conditions of a subject and/or the photographing time are automatically identified, and the type of a decoration that shall be added to image data is automatically selected in accordance with the identified conditions through the special photographing function (especially, the function of applying an effect to image data) of a photographing device. Hereinafter, the third embodiment will be described with an emphasis on the differences between the third embodiment, and the first and second embodiments. Further, the present embodiment is achieved by using the functions of the mobile-phone terminal 1 of the first embodiment, and part of the functions is modified.

Figure 7:
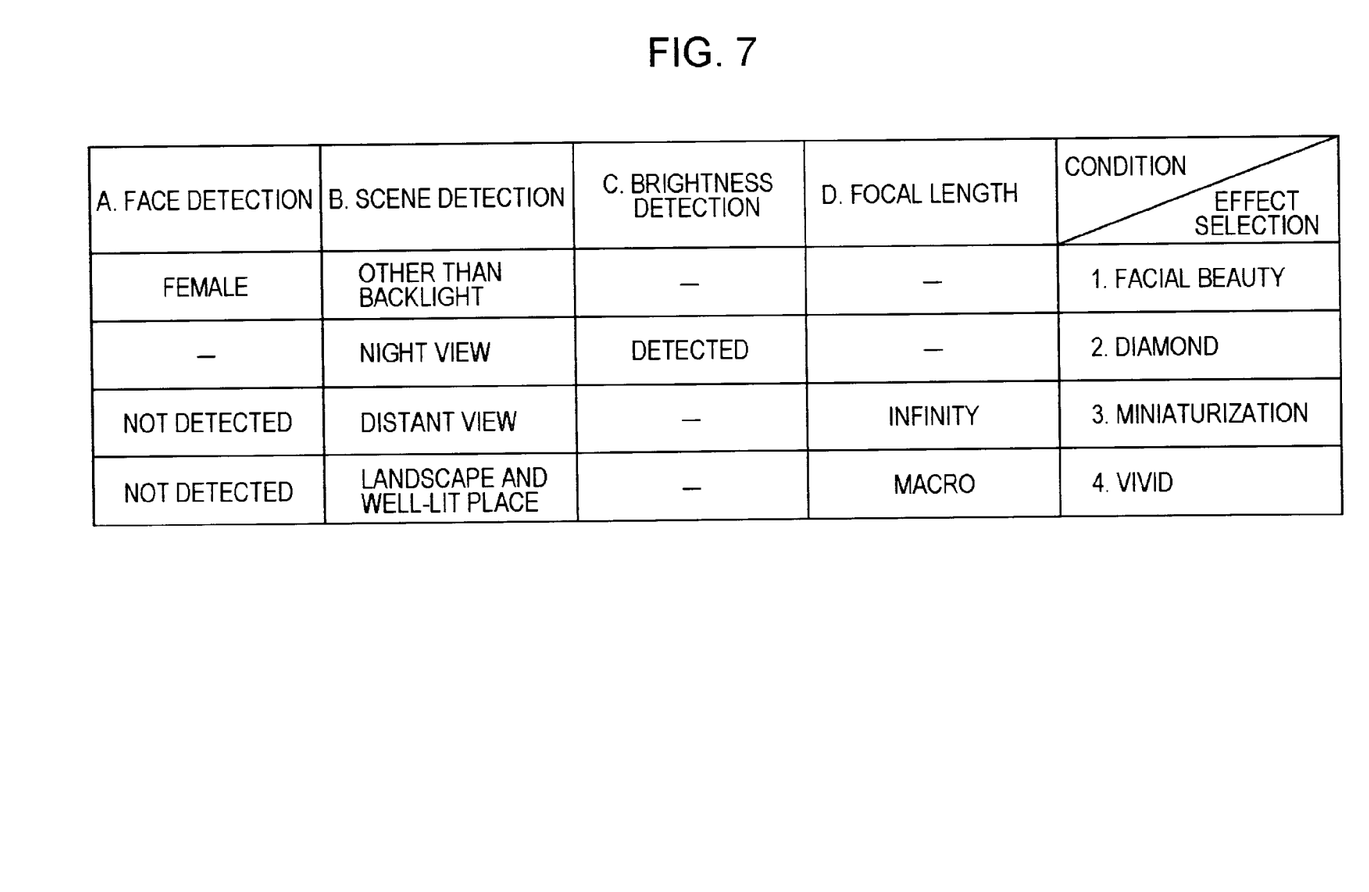
FIG. 7 illustrates exemplary condition-table data according to a third embodiment.

In the mobile-phone terminal 1, data of conditions for automatically selecting the effect type should be compiled as the condition-table data, and the condition-table data should be stored in the mobile-phone terminal 1 in advance. FIG. 7 illustrates an example of the condition-table data stored in the storage unit 17. According to FIG. 7, a plurality of effects are set based on data of the conditions of the subject and/or the photographing time, the data being output from the face-detection unit 31, the scene-detection unit 32, the brightness-detection unit 36, and the focal-length acquisition unit 37. The condition-table determination unit 39 selects any of the effects by referring to the condition-table data illustrated in FIG. 7.

According to FIG. 7, first, an image photographed through the camera 21 is classified as "face included" or "no face included" in the category of "A. Face Detection". Next, when the image is classified as "face included", it is further determined that whether or not the image shows the face of a "female". Further, the image is classified as "other than backlight", "night view", "distant view", "landscape", or "well-lit place" in the category of "B. Scene Detection". Still further, it is determined whether or not brightness with a value not less than a specified value is "detected" from the image in the category of "C. Brightness Detection". Still further, the focus setting obtained at the photographing time is classified as "infinity" or "macro" in the category of "D. Focal Length".

Then, effects "facial beauty", "diamond", "miniaturization", "vivid" are prepared based on combinations of the above-described conditions. Each of the effects will be briefly described below.

Facial-beauty effect . . . a generic name of effects of making a face image more beautiful, that is, the effect of making a face image whiter (whitening effect), the effect of increasing an image of eyes, etc.

Figure 8A:
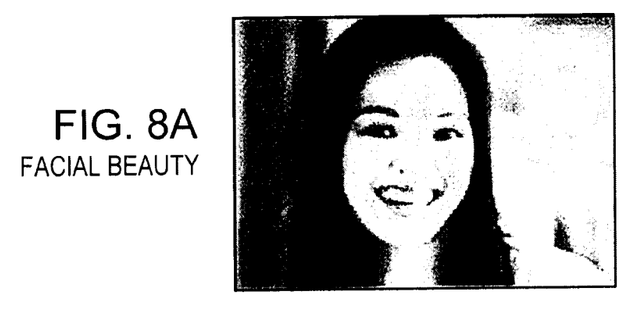
FIG. 8A illustrates an exemplary image with an applied effect.
Figure 8B:
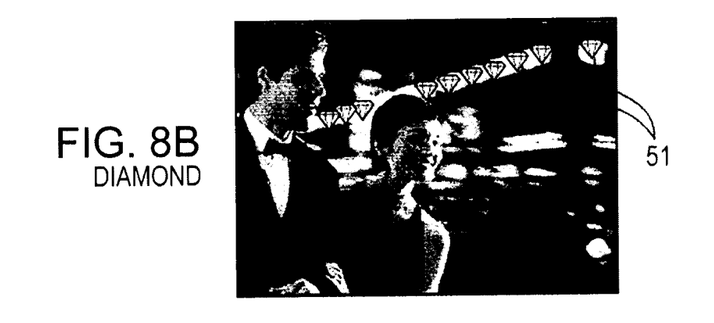
FIG. 8B illustrates an exemplary image with a different applied effect.
Figure 8C:
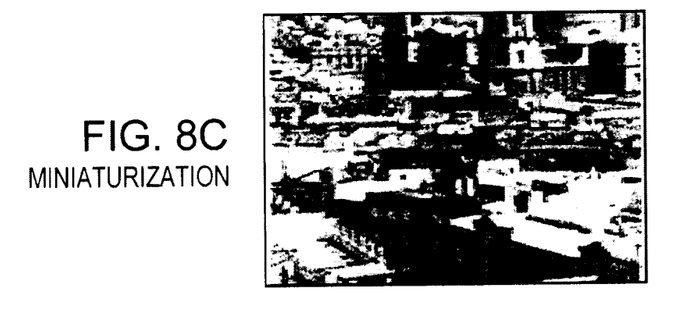
FIG. 8C illustrates an exemplary image with a different applied effect.
Figure 8D:
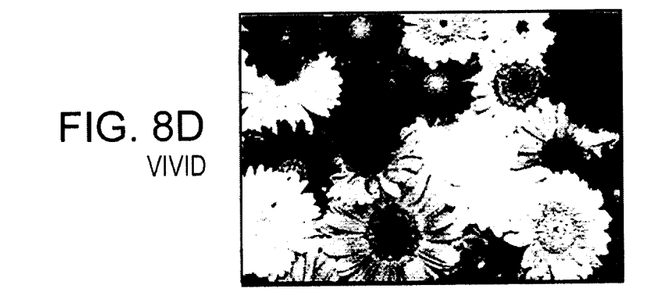
FIG. 8D illustrates an exemplary image with a different applied effect.

Diamond effect . . . the effect of making an area shine, the area having brightness with a value not less than a specified value Miniaturization effect . . . the effect of causing the background of an image to appear blurred and increasing the contrast of the center part of the image, which makes a subject look like being miniaturized Vivid effect . . . the effect of increasing the brightness and contrast of an image to increase the sharpness of the image FIGS. 8A, 8B, 8C, and 8D illustrate individual exemplary images to which the effects "facial beauty", "diamond", "miniaturization", "vivid" are applied, the images being displayed on the display unit 14. FIG. 8B illustrates an image including high-brightness part showing a street lamp, to which images of diamonds illustrated with reference numeral 51 are added. Although the diamond images 51 are displayed in the present embodiment, the diamond effect may be achieved by increasing the brightness of the street-lamp part.

Figure 9:
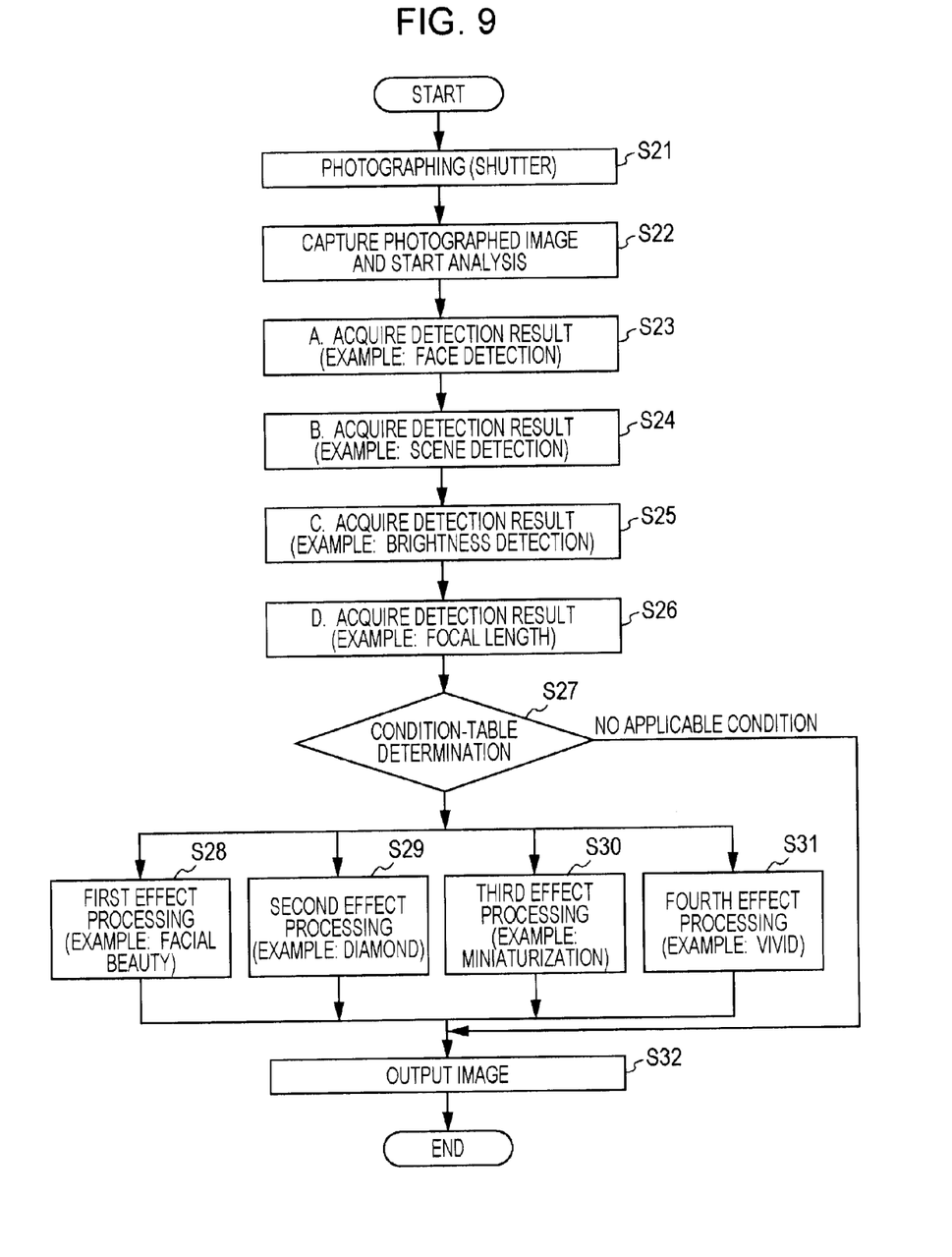
FIG. 9 is a flowchart illustrating different exemplary processing from photographing to image output.

Next, processing from the photographing to the image output will be described with reference to a flowchart of FIG. 9. The processing procedures corresponding to steps S21 to S24 that are illustrated in FIG. 9 are equivalent to and/or substantially equivalent to the processing procedures of steps S1 to S4 that are illustrated in FIG. 5. Therefore, the descriptions of steps S21 to S24 are simplified.

First, after the power of the mobile-phone terminal 1 is turned on, the user operates the operation unit 16 to instruct the camera 21 to perform photographing (release the shutter) at step S21.

The camera 21 captures optical-image data input to the image-pickup device (input video), and outputs the image data corresponding to the input video to the storage unit 17. Then, the control unit 11 reads and executes the computer program stored in the storage unit 17, and starts analyzing the image data temporarily stored in the storage unit 17 at step S22.

The face-detection unit 31 (see FIG. 2) performs the face detection for the image data and acquires data of the detection result at step S23. Further, the scene-detection unit 32 performs the scene detection for the image data and detects that the image data does not show, for example, a backlighted scene at step S24. Further, the brightness-detection unit 36 acquires data of an area having brightness with a value not more than a specified value, the area data being included in the image data, at step S25. Further, the focal-length acquisition unit 37 acquires data of the distance between the camera 21 and the subject (the focal length) at step S26.

The condition-table determination unit 39 selects an effect that shall be added to the image data from among the condition-table data illustrated in FIG. 7 based on information acquired through the processing procedures corresponding to steps S23 to S26 at step S27, and notifies the image-processing unit 15 of the selected effect. When the condition-table data includes no applicable effects, the processing advances to step S32.

The image-processing unit 15 applies the effect notified from the condition-table determination unit 39 to the image data. According to FIG. 9, any of first effect processing performed to apply the facial-beauty effect, which corresponds to step S28, second effect processing performed to apply the diamond effect, which corresponds to step S29, third effect processing performed to apply the miniaturization effect, which corresponds to step S30, fourth effect processing performed to apply the vivid effect, which corresponds to step S31, is performed based on the effect selected from among the condition-table data.

Then, the image-processing unit 15 outputs the image data with the applied effect to the display unit 14. When it is revealed that the condition-table data includes no applicable effects during the determination processing performed at step S27, the image data picked up through the camera 21 is output to the display unit 14 as it is, at step S32. Here, the image data with the applied effect may be output to an external display section connected to the mobile-phone terminal 1 or the recording medium 25. After the image-output processing is finished, a series of the processing procedures from the photographing to the image output is finished.

In the above-described flowchart, processing procedures that are performed to acquire the detection results correspond to steps S23 to S26. However, the processing procedures may be performed in a different order without being limited to the above-described order. Further, depending on the type of the condition of the subject and/or the photographing time, the detection results that are obtained immediately before the photographing is performed become equivalent to those obtained at the photographing time. For example, when photographing a subject that remains at rest in a room, it is estimated that the results of the face detection, the scene detection, the brightness detection, and the focal-length acquisition that are performed at steps S23 to S26 immediately before the photographing is performed are substantially equivalent to those of the face detection, the scene detection, the brightness detection, and the focal-length acquisition that are performed at the photographing time.

According to the above-described third embodiment, an appropriate decoration is automatically selected for each of the various conditions of the subject and/or the photographing time so that an output image with an applied visually-appropriate effect can be automatically acquired, which increases the photographing quality.

Further, since the condition-table data is prepared in advance, it becomes possible to save the user time and troubles to set the effects in advance. Consequently, the convenience of the user is increased.

Further, the third embodiment may be combined with the first embodiment (and/or the second embodiment). That is, when the diamond effect is selected through the application of the third embodiment, further detailed conditions may be detected by analyzing target image data, and the decoration types that are described in the first embodiment (and/or the second embodiment) may be selected based on the detected conditions.

Although the present specification is applied to the mobile-phone terminal including the photographing device in each of the above-described embodiments, the present specification may be applied to all devices and systems including the photographing device.

Further, in each of the above-described embodiments, it may be arranged that the user can selectively turn on/off the decoration/effect mode and the decoration/effect is applied to image data picked up through the camera 21 only when the decoration/effect mode is turned on.

Further, even though the image to which the duration/effect is applied is a still image in each of the above-described embodiments, the still image may be replaced by a moving image according to another embodiment.

Although the diamond effect is used to make the certain area of the night-view image shine, the area having brightness with the value not less than the specified value, in the above-described third embodiment, the diamond effect can be applied to a different scene without being limited to the night view. Further, even though the diamond images are added to the high-brightness area, the brightness may not necessarily be high. That is, a different area where the diamond images are applied may be determined based on the color of the area. Further, images other than the diamond images may be added. Thus, the flexibility of the diamond effect is increased by widening the applicability of the diamond effect.

Further, the series of processing procedures of the above-described embodiments may be executed not only through hardware, but also through software. When the series of processing procedures is executed through the software, a program constituting the software is installed into a specifically designed hardware of a computer and/or a program provided to execute various functions is installed into a computer so that each of the computers can execute the series of processing procedures. For example, a program constituting desired software may be installed into a general-purpose computer provided in a mobile terminal so that the computer can execute the program.

Further, a recording medium recording the program code of software achieving the functions of the above-described embodiments may be supplied to a mobile terminal including a computer. Further, the functions can also be achieved by the computer (or a control device such as a CPU) of the mobile terminal, which reads and executes the program code recorded onto the recording medium. Furthermore, an OS or the like running on the computer may execute part of or the entire actual processing based on instructions of the program code so that the functions of the above-described embodiments are achieved through the processing, which is also one of the embodiments.

Further, in this specification, the processing steps describing the time-sequential processing include not only processing executed in time sequence according to the written order but also processing that is not necessarily executed in time sequence but can be executed in parallel and/or separately (e.g., parallel processing and/or processing performed through an object).

Thus, without being limited to the above-described embodiments, the present embodiments can be modified and applied in various ways within the scope of the appended claims thereof.

What is claimed is:

1. A terminal apparatus comprising:
an image capturing unit configured to capture an image of a subject;
a storage unit configured to store associated information related to an image with at least one effect to be applied to an image; and
circuitry configured to
detect or receive information related to the image captured by the image capturing unit,
select an effect stored in the storage unit based on the detected or received information related to the image, and
apply the selected effect within an area of the captured image,
wherein the circuitry performs control to add a decoration image within the area of the captured image as the effect, and the decoration image is added to the captured image at a part of the image having brightness with a value equal to or higher than a specified value.

2. The terminal apparatus according to claim 1, wherein the size of the decoration image is based on a size of the subject of the image or a size of an area on the image where the decoration is to be added.

3. The terminal apparatus according to claim 1, wherein the color and/or brightness of the decoration image is based on the background color and/or brightness of an area of the image where the decoration image is to be added.

4. A terminal apparatus comprising:
an image capturing unit configured to capture an image of a subject;
a storage unit configured to store associated information related to an image with at least one effect to be applied to an image; and
circuitry configured to
detect or receive information related to the image captured by the image capturing unit,
select an effect stored in the storage unit based on the detected or received information related to the image, and
apply the selected effect within an area of the captured image,
wherein the circuitry performs control to add a decoration image within the area of the captured image as the effect, and
wherein the decoration image is selected based on a distance from a location where a previous image was captured, and the type of decoration image depends on the amount of the distance.

5. The terminal apparatus according to claim 1, wherein the circuitry detects a gender of a subject in the captured image as the information related to the captured image.

6. The terminal apparatus according to claim 1, wherein the circuitry detects whether or not a face is detected in the captured image as the information related to the captured image.

7. The terminal apparatus according to claim 6, wherein when a face is detected in the captured image, the circuitry further detects whether or not the face is smiling.

8. The terminal apparatus according to claim 1, wherein the circuitry detects whether or not a landscape is included in the captured image as the information related to the captured image.

9. The terminal apparatus according to claim 1, wherein the circuitry receives user information related to the captured image as the information related to the captured image.

10. The terminal apparatus according to claim 1, wherein the circuitry receives location information related to the captured image as the information related to the captured image.

11. The terminal apparatus according to claim 1, wherein the circuitry receives photographing time information related to the captured image as the information related to the captured image.

12. A terminal apparatus comprising:
an image capturing unit configured to capture an image of a subject,
a storage unit configured to store associated information related to an image with at least one effect to be applied to an image; and
circuitry configured to
detect or receive information related to the image captured by the image capturing unit,
select an effect stored in the storage unit based on the detected or received information related to the image, and
apply the selected effect within an area of the captured image,
wherein the circuitry performs control to add a decoration image within the area of the captured image as the effect,
wherein the control unit receives photographing time information related to the captured image as the information related to the captured image, and
wherein the photographing time information is information of a portion of a year when the image was captured.

13. A method implemented on a terminal apparatus comprising:
capturing an image of a subject;
storing associated information related to an image with at least one effect to be applied to an image;
detecting or receiving information related to the captured image, and selecting stored effect based on the detected or received information related to the image; and
applying the selected effect within an area the captured image,
wherein a decoration image is added within the area of the captured image as the effect, and the decoration image is added to the captured image at a part of the image having brightness with a value equal to or higher than a specified value.

14. A non-transitory computer readable storage medium encoded with computer executable instructions, which when executed by a terminal apparatus, cause the mobile terminal apparatus to perform a method comprising:
capturing an image of a subject;
storing associated information related to an image with at least one effect to be applied to an image;
detecting or receiving information related to the captured image, and selecting stored effect based on the detected or received information related to the image; and
applying the selected effect within an area the captured image,
wherein a decoration image is added within the area of the captured image as the effect, and the decoration image is added to the captured image at a part of the image having brightness with a value equal to or higher than a specified value.

15. The terminal apparatus according to claim 1, wherein the circuitry detects whether or not a face is detected in the captured image as the information related to the captured image, and the storage unit stores first associated information and second associated information, the first associated information including a first effect to be applied to an image when a face is detected in the image and the second associated information including a second effect, that is different than the first effect, to be applied to an image when a face is not detected in the image.

* * * * *